United States Patent
Olsen et al.

(10) Patent No.: US 8,358,083 B2
(45) Date of Patent: Jan. 22, 2013

(54) SYSTEM AND METHOD INCLUDING SELF OSCILLATING FEEDBACK FOR ACOUSTIC OPERATION OF A DISCHARGE LAMP

(75) Inventors: Joseph A. Olsen, Gloucester, MA (US); Warren P. Moskowitz, Ipswich, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 524 days.

(21) Appl. No.: 12/642,106

(22) Filed: Dec. 18, 2009

(65) Prior Publication Data

US 2011/0148307 A1  Jun. 23, 2011

(51) Int. Cl.
*H05B 37/02* (2006.01)
(52) U.S. Cl. .................... 315/291; 315/224
(58) Field of Classification Search ........... 315/209 R, 315/224, 225, 246, 247, 291, 307, 308
See application file for complete search history.

(56) References Cited

U.S. PATENT DOCUMENTS

| | | | |
|---|---|---|---|
| 5,859,506 A * | 1/1999 | Lemke | 315/308 |
| 6,118,415 A | 9/2000 | Olson | |
| 6,124,683 A | 9/2000 | Olsen et al. | |
| 6,184,633 B1 | 2/2001 | Kramer | |
| 6,696,800 B2 | 2/2004 | Kramer et al. | |
| 6,809,483 B2 * | 10/2004 | Alexandrov | 315/224 |
| 6,844,687 B1 | 1/2005 | Chen | |
| 2005/0168176 A1 * | 8/2005 | Stockwald | 315/312 |

FOREIGN PATENT DOCUMENTS

WO   WO 2007/128472   11/2007

* cited by examiner

*Primary Examiner* — Jimmy Vu
(74) *Attorney, Agent, or Firm* — Robert F. Clark; Andrew Martin

(57) ABSTRACT

A system and method including self oscillating feedback for acoustic operation of a discharge lamp. The system includes a ballast configured to receive a modulation input and modulate a lamp power signal in accordance with the modulation input. A photodetector senses the optical output of the lamp to provide an electrical feedback to a feedback circuit. The feedback circuit filters the feedback to couple a portion thereof corresponding to a selected acoustic resonance mode of the lamp to the ballast as the modulation input thereby causing self-oscillation at the selected acoustic resonance mode.

19 Claims, 4 Drawing Sheets

SYSTEM AND METHOD INCLUDING SELF OSCILLATING FEEDBACK FOR ACOUSTIC OPERATION OF A DISCHARGE LAMP

TECHNICAL FIELD

The present application relates to a system and method including self oscillating feedback for acoustic operation of a discharge lamp.

BACKGROUND

The use of gas discharge lamps, such as high intensity discharge (HID) lamps, is common in a wide variety of applications. In a gas discharge lamp, light is emitted from an arc discharge established between lamp electrodes. Typically the lamp includes a lamp bulb including a sealed arc tube therein. The arc tube may enclose a fill material including, for example, one or more metal halides that are vaporized in the arc between the electrodes to establish the arc discharge. The fill may also include a buffer for limiting energy transfer from the arc discharge to the tube walls and, in some circumstances, a starting gas. The electrodes may be positioned at the top and bottom of the arc tube, and may be coupled to a ballast for generating the arc discharge in the fill material between the electrodes. The arc discharge between the electrodes emits light that passes through the light-transmissive materials of the tube and bulb for providing illumination.

It is known that under certain operating conditions the arc discharge may take an undesirable shape and/or become unstable. For example, operating a lamp with its axis in a horizontal position can result in an arc discharge which is bowed, or curved upwardly. In a non-horizontal position, the arc discharge may take a contorted shape, which may be unstable, and vapor phase segregation (incomplete mixing of the metal additives in the vapor phase of the discharge) may occur. These undesirable conditions in the arc discharge can lead to color separation over the length of the tube, unintended extinguishing of the arc discharge, reduced light output, local overheating of the arc tube wall, and other problems that may cause premature lamp failure. This may be particularly true for lamps having relatively high aspect ratio arc tubes, e.g. tubes whose length-to-width ratio is greater than about 2.

To reduce or avoid these conditions, modulation of the input lamp power at acoustic frequencies has been proposed. Modulation of lamp power causes modulation of the arc temperature distribution and, as a result, modulation of the gas pressure distribution throughout the arc discharge tube of the lamp. Certain frequencies of lamp power modulation cause standing wave acoustic oscillation of the gas pressure in the tube compelling gas or vapor movement to counter segregation or gravity-induced convection in the arc discharge.

The acoustic standing wave modes of the gas pressure in discharge lamps are known to those of skill in the art. In general, because of the generally cylindrical shape of commercial arc discharge tubes, the acoustic modes can generally be described as modes of a cylinder of a size comparable to the cavity in which the arc is formed in the arc tube of the lamp. If the pressure has a spatial dependence along the axis of the tube (i.e., the cylinder of comparable size), then the mode is longitudinal with the number of half-wavelengths in the standing wave determining the order of the mode. For example, if there are two half-wavelengths, the mode is the second longitudinal (2L) mode. If the pressure has a spatial dependence along the radius of the tube, then the mode is radial, and if the pressure has a spatial dependence around the circumference of the tube, then the mode is azimuthal. Combination acoustic modes are also possible, such as radial-longitudinal modes and azimuthal-longitudinal modes, in which the pressure distribution varies along more than one coordinate. These combination modes can be further defined, depending on the periodicity of the standing wave, such as a combination acoustic mode of the third azimuthal and second longitudinal modes.

The lamp power modulation frequencies for exciting any acoustic mode may be estimated using cylindrical models, as described for example in U.S. Pat. No. 6,844,687, the teachings of which are hereby incorporated herein by reference. Excitation of certain modes in the arc discharge tubes have been found to be particularly effective in avoiding associated conditions in the arc discharge. For example, exciting the second azimuthal (2A) mode may be particularly effective for straightening an arc discharge. Also, exciting the second longitudinal (2L) mode has been found to be particularly effective in reducing or avoiding segregation.

BRIEF DESCRIPTION OF THE DRAWINGS

Reference should be made to the following detailed description which should be read in conjunction with the following figures, wherein like numerals represent like parts.

DETAILED DESCRIPTION

In the efforts leading to the embodiments described herein, it has been discovered that the resonant frequency of an excited mode may shift from an expected non-excited frequency to a lower excited frequency due to a changing arc temperature profile caused by the excited gas flow. In one example, the 2L frequency shifts from about 26 KHz when not excited to 22.5 KHz when fully excited. Frequency shift may also occur due to aging of lamp components. Also, a difference in an estimated resonant frequency of a particular mode compared to the actual frequency may exist as a result of manufacturing tolerance or inaccuracy in estimation. In a system consistent with the present disclosure, the lamp power modulation frequency is controlled to set and track the resonant frequency of the lamp using a closed-loop self-oscillating positive feedback system that resonates at the acoustic resonance frequency associated with the excited mode. Shifting of the lamp resonant frequency thus results in a corresponding shift in the lamp power modulation frequency, thereby ensuring that the power modulation frequency is set at the desired resonant frequency.

Figure 1:
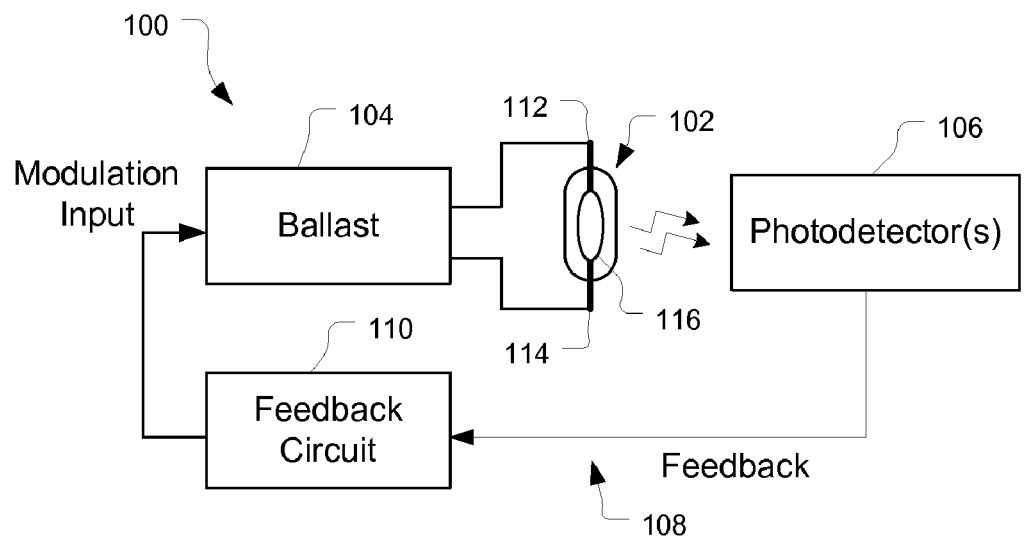
FIG. 1 is a block diagram of one exemplary embodiment of a system consistent with the present disclosure.

FIG. 1 is a simplified block diagram of one exemplary embodiment 100 of a system consistent with the present disclosure. The system includes: a gas discharge lamp 102 coupled to and driven by a ballast 104; a photodetector 106 disposed adjacent the lamp 102 so that light emitted from the lamp is imparted thereon; and a feedback loop 108 including a feedback circuit 110 for coupling an output of the photodetector 106 to the ballast 104 to provide a positive feedback modulation input to the ballast 104. The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

In general, the output of the ballast 104 is coupled to respective electrodes 112, 114 of the discharge lamp 102. The ballast provides an electrical power signal to the lamp 102 sufficient for establishing arc discharge 116 in the arc tube whereby light is emitted from the lamp. The ballast 104 may take any known configuration for driving the lamp 102, and may provide a power signal having one or more lamp power modulation frequencies selected to excite one or more acoustic resonant modes in the lamp.

Light emitted by the arc discharge 116 is imparted on the photodetector 106. The photodetector 106 may be any known device, such as a PIN photodiode, for providing an electrical output proportional to the light imparted thereon. The electrical output of the photodetector 106 is coupled to the feedback circuit 110 through the feedback loop 108. The feedback circuit 110 may include at least one filter for filtering frequencies corresponding to undesired resonant modes (i.e. modes that are not intended to be excited in the lamp by the ballast) and passing frequencies corresponding to a selected resonant mode as positive feedback modulation input to the ballast 104. The feedback circuit 110 may also be configured for establishing greater than unity feedback gain and a 0° (or an integer multiple of 360°) loop phase shift.

The modulation input to the ballast 104 may be coupled to an amplitude modulator. The amplitude modulator may modulate the power signal output of the ballast 104 in accordance with the modulation input for establishing the lamp power modulation frequency in the power signal. The positive feedback to the ballast thus establishes a closed-loop self-oscillating positive feedback for driving the lamp 102 at the precise lamp power modulation frequency required to excite a desired acoustic resonance mode in the lamp. Tracking the resonant frequency of the arc discharge using positive feedback to establish self-oscillation in a manner consistent with the present disclosure reduces or avoids any variation between the lamp power modulation frequency and a shifting of the lamp resonant frequency, which could result in instability of the discharge and inefficient or failed operation of the lamp.

Figure 2:
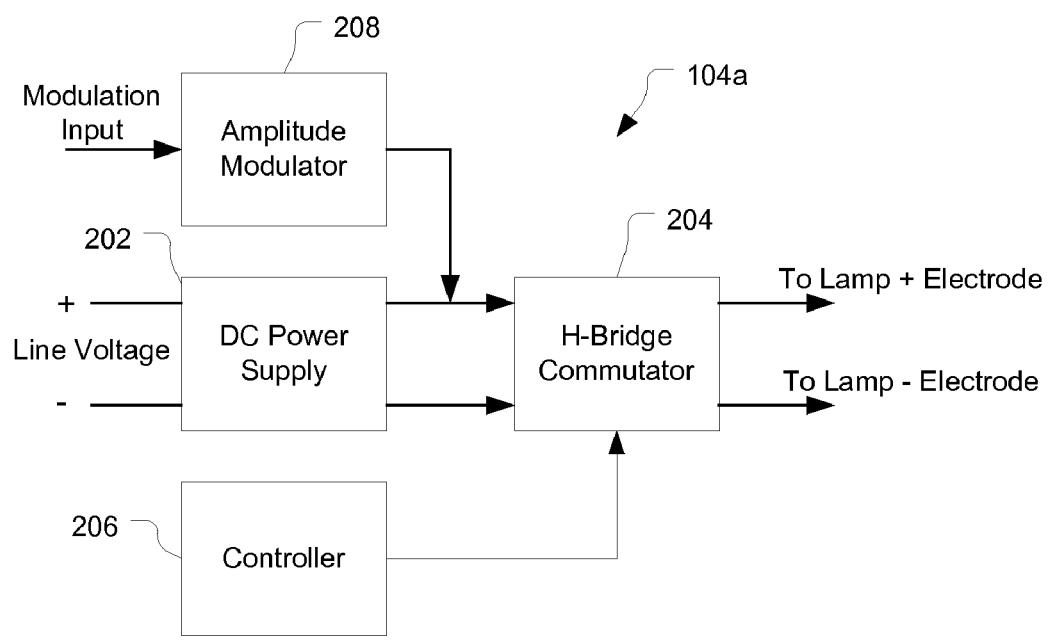
FIG. 2 is block diagram of one exemplary embodiment of a ballast useful in a system consistent with the present disclosure.

A system consistent with the present disclosure may be configured to excite any mode or combination of acoustic resonant modes in the lamp, and can provide self-oscillating positive feedback to any known ballast configuration for exciting such modes. FIG. 2 schematically illustrates one example 104a of a ballast configuration useful for implementing a system and method consistent with the present invention. Those of ordinary skill in the art will recognize that the ballast 104a is shown in simplified form for ease of explanation. Although a specific embodiment of a ballast is illustrated in FIG. 2, it is to be understood that a system and method providing self-oscillating positive feed-back consistent with the present disclosure may be implemented using wide variety of known ballast configurations. Also, the illustrated ballast operates from an alternating current (AC) main power source for driving an AC lamp configuration. It is to be understood, however, that the ballast may operate from a direct current (DC) main power source, e.g. a vehicle battery, and/or the ballast may drive a DC lamp configuration.

In the exemplary embodiment shown in FIG. 2, the ballast 104a includes a DC power supply 202, an H-bridge commutator 204, a controller 206, and an amplitude modulator 208. The DC power supply may take a known configuration for receiving an alternating current input voltage, e.g. line voltage, and providing a regulated DC output voltage. The modulation input provided from the positive feedback loop may be coupled to the amplitude modulator 208. The amplitude modulator 208 may impart an acoustic amplitude modulation on the DC output voltage of the DC power supply 202 in accordance with the modulation input. A variety of amplitude modulator configurations for modulating the output of the DC power supply are known to those of ordinary skill in the art.

Figure 3:
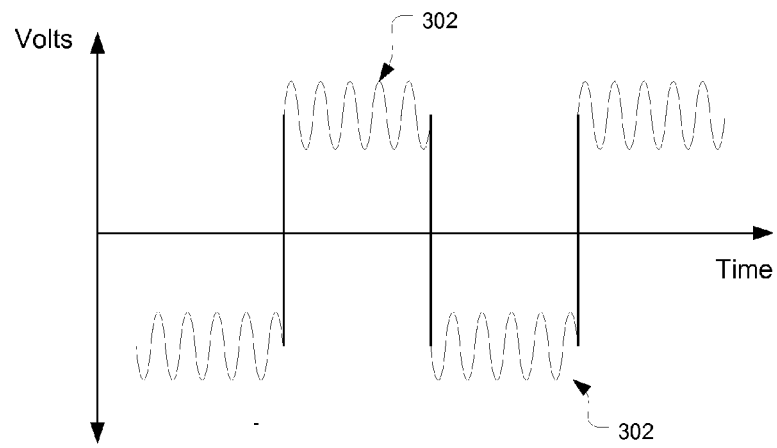
FIG. 3 graphically illustrates an output voltage vs. time characteristic associated with the ballast shown in FIG. 2.

The modulated DC output voltage may be coupled to the H-bridge commutator 204, which may also take a known configuration. The outputs of the H-bridge commutator 204 may be coupled to associated ones of the lamp electrodes. The controller 206 may be coupled to the H-bridge commutator 204, in a known manner, for switching the commutator to provide an acoustically modulated square wave output to the lamp, as illustrated for example in FIG. 3. The frequency of the acoustic modulation 302 imparted by the amplitude modulator 208 in accordance with the modulation input may be selected for exciting a desired acoustic resonance mode in the lamp. As discussed above, self-oscillating positive feedback provided through the photodiode and the feedback loop results in tracking of any variance or shifting in the resonant frequency of the selected mode. Reliable and precise operation of the lamp in the desired acoustic resonance mode may thereby be established.

Since the feedback loop 108 relies on positive feedback for driving the amplitude modulator at a lamp power frequency associated with a selected mode, the switching of the DC power supply output to the lamp by the H-bridge commutator 204 under control of the controller 206 may start the feedback necessary to drive amplitude modulator. In one embodiment, the controller 206 may cause switching of the H-bridge commutator at the nominal non-excited resonant frequency associated with the selected resonance mode. In another embodiment, the amplitude modulator 208 may be configured to impart an initial modulation at the nominal non-excited resonant frequency and subsequently impart modulation only in response to the modulation input. Other methods of starting the feedback loop, such as simple pulsing of the output of the DC power supply 202, adding a broadband noise to the lamp power, and momentarily breaking the feedback loop 108, may be implemented.

Figure 4:
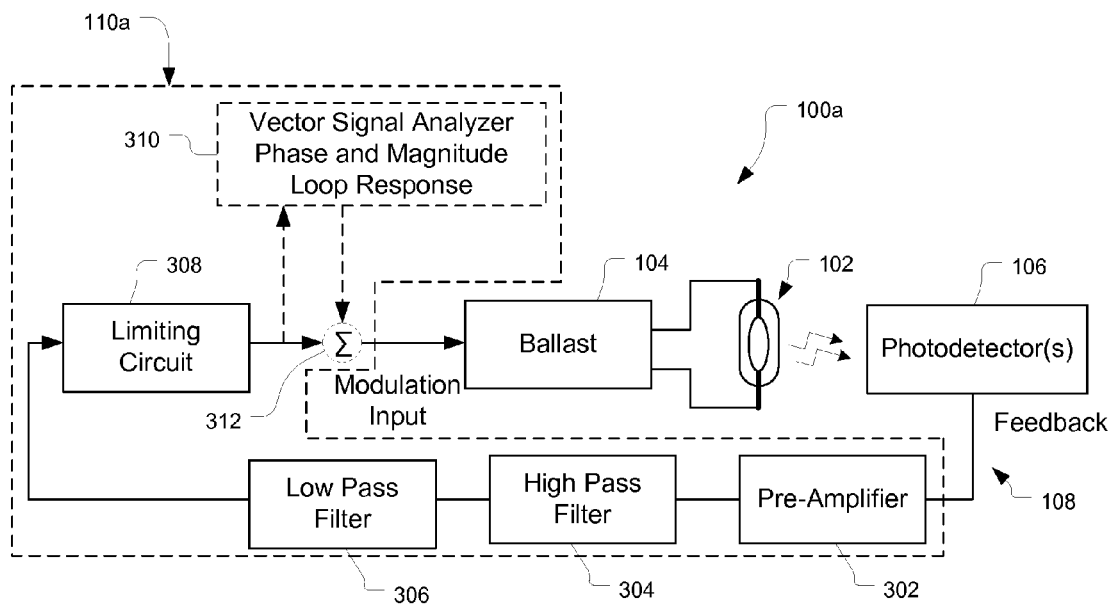
FIG. 4 is a block diagram of another exemplary embodiment of a system consistent with the present disclosure.

Those of ordinary skill in the art will recognize that self-oscillating positive feedback can be established using a wide variety of feedback circuit configurations. FIG. 4, for example, illustrates an exemplary embodiment 100a of a system consistent with the present disclosure having a feedback circuit 110a including a pre-amplifier 302, a high pass filter 304, a low pass filter 306, a limiting circuit 308, and an optional vector signal analyzer 310.

In the illustrated exemplary embodiment, the output of the photodetector 106 is coupled to the pre-amplifier 302. The pre-amplifier 302 may be any known electrical amplifier configuration for providing amplification across the bandwidth of a selected resonant mode, and may be configured to provide sufficient amplification to allow subsequent filtering of the photodiode output in the feedback loop 108. In a system wherein the photodetector output is sufficient to allow filtering in the feedback loop, e.g. wherein the photodetector includes an amplifier, the pre-amplifier may be optional. The output of the pre-amplifier 302 may be coupled to the high 304 and low pass 306 filters.

The high pass filter 304 may be a known filter configuration for passing signals at the frequency of the selected resonant mode and higher, while blocking signals at frequencies lower than the selected resonance mode. The low pass filter 306 may be a known filter configuration for passing signals at the frequency of the selected resonant mode and lower, while blocking signals at frequencies higher than the selected resonance mode. The high and low pass filters thus combine to pass only a band of frequencies corresponding to the selected resonant mode to the limiting circuit 308.

The pass band of the combined high 304 and low pass 306 filters may be selected to account for the expected frequency drift of the selected resonant mode. In one embodiment, for example, the pass band may be centered on a nominal (estimated) non-excited frequency of the selected resonant mode and extend about ±15% therefrom. As the frequency of selected resonant mode drifts, therefore, it will remain within the pass band of the combined high and low pass filters. Although the illustrated embodiment includes high 304 and low pass 306 filters, those of ordinary skill in the art will recognize output of the photodetector 106 may be filtered to pass the selected resonance mode using other known filter configurations. For example, a band pass filter including a pass band centered on the nominal non-excited frequency of the selected resonant mode may be substituted for the high and low pass filters.

The limiting circuit 308 may be configured for maintaining the amplitude of modulation input to the ballast 104 at a fixed level and to limit the loop gain to unity at the quiescent oscillation amplitude for allowing stable self-oscillation. A variety of limiting circuit configurations are well-known to those of ordinary skill in the art. The limiting circuit may be configured, for example, as an automatic gain control (AGC) amplifier, back-to-back Zener clamping diodes, or a combination of operational amplifiers and digital-to-analog converters that provide an adjustable output. An optional known vector signal analyzer 310 may be provided to monitor the output of the limiting circuit 308. The vector signal analyzer may be configured to provide an output to an adder 312 for combining with the limiting circuit output to adjust the phase and/or magnitude thereof to for ensuring and maintaining self-oscillation. Other methods of establishing and maintaining the loop phase and loop gain necessary to achieve self-oscillation are known to those of ordinary skill in the art.

The photodetector 106 may be placed at any fixed location relative to the lamp 102 for receiving the lamp light output and providing an electrical signal representative of the resonance frequency of the selected mode. For example, the photodetector 102 may be mounted to a fixed location integral with the lamp, e.g. on a shroud associated with the arc tube, on the bulb, or on a separate mounting fixture within or adjacent to the bulb. Alternatively, the photodetector 106 may be mounted at a remote fixed location, e.g. on the ballast, and optical elements such as an optical fiber may positioned for collecting light from the lamp and coupling the light to the photodetector 106.

Figure 5:
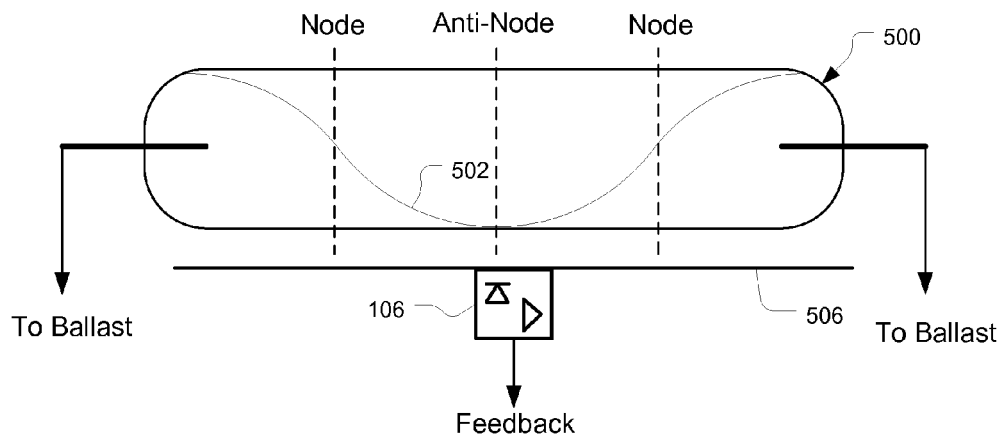
FIG. 5 diagrammatically illustrates placement of a photodetector relative to an arc discharge tube in a system consistent with the present disclosure.

In one embodiment, the photodetector 106 may be placed at a fixed location relative to the lamp corresponding to the location of a temperature anti-node of the selected resonance mode. Those of ordinary skill in the art will recognize that the temperature anti-nodes are also pressure anti-nodes. A temperature anti-node is a location of highly fluctuating light that provides for discrimination of resonant frequencies at the output of the photodetector. FIG. 5, for example, diagrammatically illustrates an exemplary arc discharge tube 500 exhibiting a 2L standing wave acoustic resonance depicted by wave 502. As shown, the 2L acoustic resonance has nodes about ¼ of the way from each end of the discharge tube and anti-nodes at the ends and center of the tube. The photodetector 106 may be mounted at a fixed location 506 approximately corresponding to a temperature anti-node, as shown. Of course, other modes would have temperature nodes and anti-nodes at different locations from those depicted in FIG. 5. Also, as discussed above the resonance frequency, and hence the temperature nodes and anti-nodes, associated with a selected mode may shift once excited.

Figure 6:
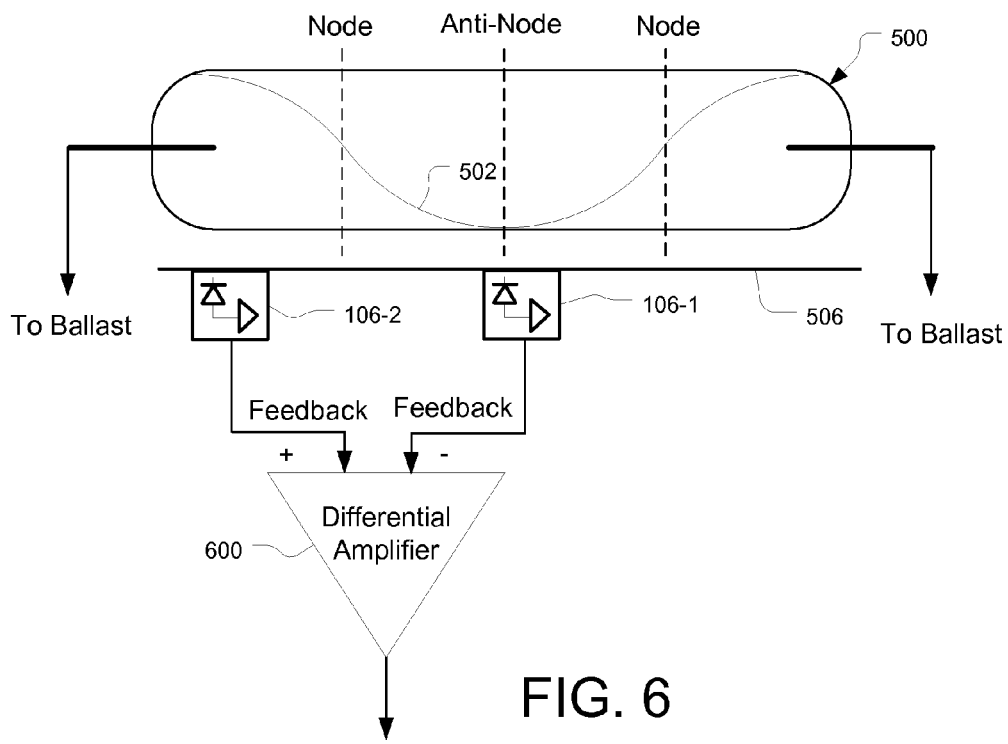
FIG. 6 diagrammatically illustrates placement of first and second photodetectors relative to an arc discharge tube in a system consistent with the present disclosure.

Improved discrimination of resonance frequencies may be obtained by placing a first photodetector 106-1 approximately at a positive-phase anti-node at the center of the tube and a second photodetector 106-2 adjacent an end of the tube near a negative phase anti-node, as shown for example in FIG. 6. The photodetector 106-2 adjacent the end of the tube may not be placed at the very end of the tube where anti-node is located because there is no arc at that location, the gas is cold and there is very little light output. Instead, the photodetector 106-2 may be placed at bright spot in front of the electrode. The outputs of the photodetectors 106-1, 106-2 may be coupled to the positive and negative inputs, respectively, of a known differential amplifier 600. The differential amplifier 600 may thus provide an output representative of the difference between the light at the positive-phase anti-node and the negative phase anti-node.

Figure 7:
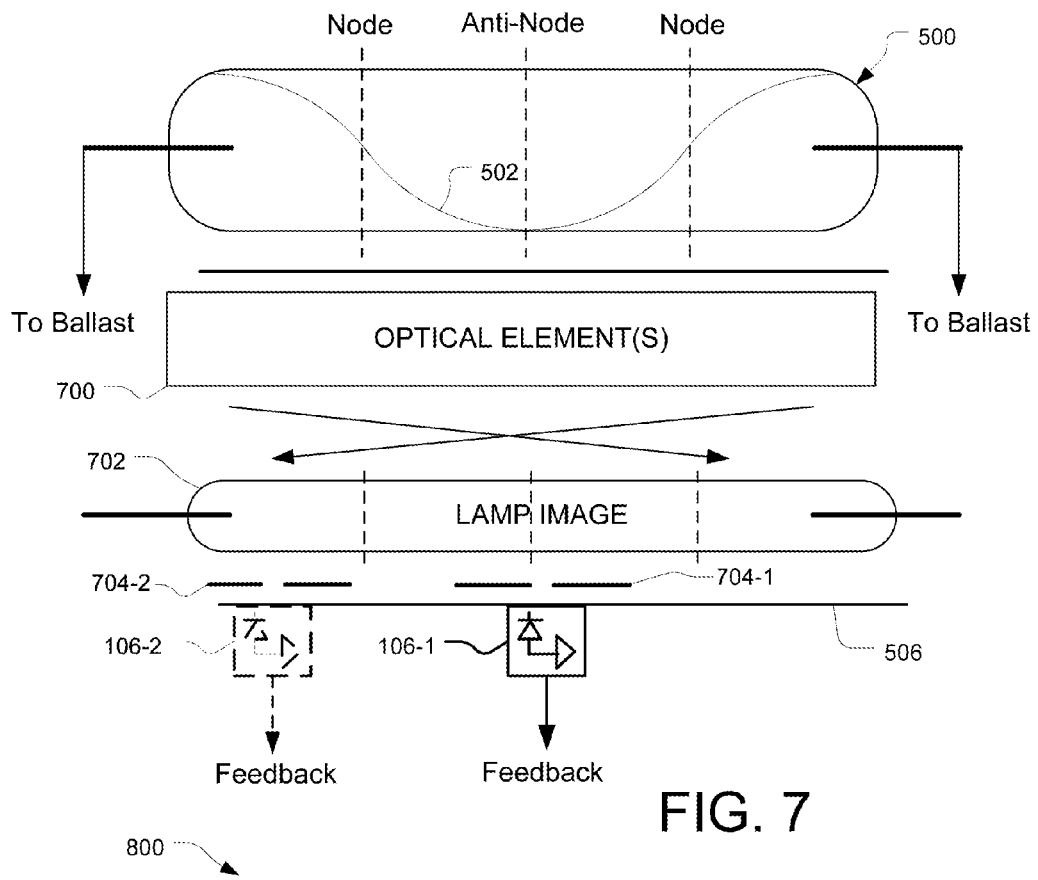
FIG. 7 diagrammatically illustrates placement of optical element(s) for projecting a lamp image on photodetector(s) in a system consistent with the present disclosure.

In an embodiment wherein the photodetectors are spaced from the lamp 102, e.g. at a distance where the emitted light is diffuse, an optical element(s) 700 may be provided adjacent the discharge tube 500 for projecting a lamp image 702 on the photodetector(s), as shown for example in FIG. 7. The optical element(s) 700 may include one or more known lenses for imaging the light on the photodetectors 106-1, 106-2. The optical element(s) 700 may also or alternatively include one or more optical filters including a transmittance characteristic configured for passing only wavelengths associated with the selected resonance mode to the photodetectors. The filters may include, for example, known interference filters configured as discrete elements or as coatings on one or more or lenses or one or more lamp components. Such filters may be used in place of or in addition to the filters provided in the feedback loop. A mask 704-1, 704-2 may be provided adjacent each photodetector. The mask may be a generally flat opaque member including a small opening aligned with an associated photodetector 106-1, 106-2 for passing light from the anti-node(s) of the lamp image to the photodetector 106-1, 106-2 while blocking other incident light.

Figure 8:
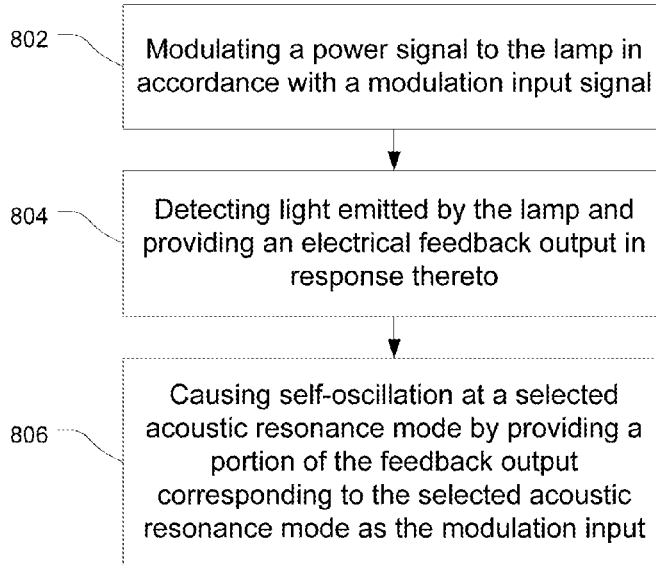
FIG. 8 is a block flow diagram of one exemplary method consistent with the present disclosure.

FIG. 8 is a block flow diagram of one method 800 for driving a gas discharge lamp consistent with the present disclosure. The illustrated block flow diagram may be shown and described as including a particular sequence of steps. It is to be understood, however, that the sequence of steps merely provides an example of how the general functionality described herein can be implemented. The steps do not have to be executed in the order presented unless otherwise indicated.

In the exemplary embodiment illustrated in FIG. 8, a power signal to the lamp may be modulated 802, e.g. by a ballast, in accordance with a modulation input signal. The light emitted by the lamp may be detected 804 and an electrical feedback signal may be provided in response thereto. Self-oscillation at a selected acoustic resonance mode may be caused 806 by providing a portion of the feedback output corresponding to the selected acoustic resonance mode as the modulation input.

According to one aspect of the present disclosure there is thus provided a system for driving a gas discharge lamp. The system includes a ballast configured to receive a modulation input and provide an output to the lamp, the output being modulated in accordance with the modulation input; a photodetector configured to provide an electrical feedback output in response to light emitted by the lamp being imparted thereon; and a feedback circuit configured to receive the feedback output. The feedback circuit includes at least one filter for passing only a portion of the feedback output corresponding to a selected acoustic resonance mode of the lamp. The feedback circuit is configured to couple the portion of the feedback output to the ballast as the modulation input to thereby cause the system to self-oscillate at the selected acoustic resonance mode.

According to another aspect of the disclosure, there is provided a system for driving a gas discharge lamp including: a ballast configured to receive a modulation input and provide an output to the lamp, the output being modulated in accordance with the modulation input; a photodetector configured to provide an electrical feedback output in response to light emitted by the lamp being imparted thereon; and a feedback circuit configured to receive the feedback output. The feedback circuit includes at least one filter for passing only a portion of the feedback output corresponding to a second longitudinal resonance mode of the lamp and a limiting circuit. The feedback circuit is configured to couple the portion of the feedback output to the ballast as the modulation input with a fixed amplitude established by the limiting circuit to thereby cause the system to self-oscillate at the second longitudinal resonance mode.

According to another aspect of the present disclosure there is provided a method of driving a gas discharge lamp. The method includes modulating a power signal to the lamp in accordance with a modulation input signal; detecting light emitted by the lamp and providing an electrical feedback output in response thereto; and causing self-oscillation at a selected acoustic resonance mode by providing a portion of the feedback output corresponding to the selected acoustic resonance mode as the modulation input.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system for driving a gas discharge lamp, said system comprising:
   a ballast configured to receive a modulation input and provide an output to said lamp, said output being modulated in accordance with said modulation input;
   a photodetector configured to provide an electrical feedback output in response to light emitted by said lamp being imparted thereon; and
   a feedback circuit configured to receive said feedback output, said feedback circuit comprising at least one filter for passing only a portion of said feedback output corresponding to a selected acoustic resonance mode of said lamp, said feedback circuit being configured to couple said portion of said feedback output to said ballast as said modulation input to thereby cause said system to self-oscillate at said selected acoustic resonance mode.

2. The system according to claim 1, wherein said feedback circuit comprises a limiting circuit for maintaining an amplitude of said modulation input at a fixed level.

3. The system according to claim 1, wherein said selected acoustic resonance mode is a second longitudinal mode of said lamp.

4. The system according to claim 1, wherein said at least one filter comprises a high pass filter and a low pass filter.

5. The system according to claim 1, wherein said photodetector is mounted adjacent said lamp at a position corresponding to an anti-node of said selected acoustic resonance mode.

6. The system according to claim 1, said system comprising a second photodetector configured to provide an second electrical feedback output in response to light emitted by said lamp being imparted thereon, and wherein said feedback circuit further comprises a differential amplifier for receiving said feedback output and said second electrical feedback output.

7. The system according to claim 1, wherein said photodetector is mounted adjacent said lamp at a position corresponding to a positive phase anti-node of said selected acoustic resonance mode, and wherein said system further comprises a second photodetector configured to provide an second electrical feedback output in response to light emitted by said lamp being imparted thereon, said second photodetector being mounted adjacent said lamp at a position corresponding to a negative phase anti-node of said selected acoustic resonance mode.

8. The system according to claim 1, said system further comprising at least one optical element for projecting an image of said lamp, and wherein said photodetector is positioned for receiving at least a portion of said image.

9. The system according to claim 8, said system further comprising a mask comprising an opaque element having an opening therein, said photodetector being positioned for receiving said light emitted by said lamp through said opening.

10. A system for driving a gas discharge lamp, said system comprising:
    a ballast configured to receive a modulation input and provide an output to said lamp, said output being modulated in accordance with said modulation input;
    a photodetector configured to provide an electrical feedback output in response to light emitted by said lamp being imparted thereon; and
    a feedback circuit configured to receive said feedback output, said feedback circuit comprising at least one filter for passing only a portion of said feedback output corresponding to a second longitudinal resonance mode of said lamp and a limiting circuit, said feedback circuit being configured to couple said portion of said feedback output to said ballast as said modulation input with a fixed amplitude established by said limiting circuit to thereby cause said system to self-oscillate at said second longitudinal resonance mode.

11. The system according to claim 10, wherein said photodetector is mounted adjacent said lamp at a position corresponding to an anti-node of said selected acoustic resonance mode.

12. A method of driving a gas discharge lamp, said method comprising:

modulating a power signal to the lamp in accordance with a modulation input signal;

detecting light emitted by said lamp and providing an electrical feedback output in response thereto; and causing self-oscillation at a selected acoustic resonance mode by providing a portion of said feedback output corresponding to said selected acoustic resonance mode as said modulation input wherein said causing self-oscillation comprises filtering said feedback output using a high pass filter and a low pass filter.

13. The method according to claim 12, said causing self-oscillation comprises setting an amplitude of said modulation input at a fixed level using a limiting circuit.

14. The method according to claim 12, wherein said selected acoustic resonance mode is a second longitudinal mode of said lamp.

15. The method according to claim 12, wherein said detecting comprises detecting said light using a photodetector mounted adjacent said lamp at a position corresponding to an anti-node of said selected acoustic resonance mode.

16. The method according to claim 12, wherein said detecting comprises detecting said light using a first photodetector configured to provide said electrical feedback output and detecting said light using a second photodetector configured to provide a second electrical feedback output, and wherein said method further comprises providing said feedback output and said second electrical feedback output to respective inputs of a differential amplifier.

17. The method according to claim 12, wherein said detecting comprises detecting said light using a first photodetector configured to provide said electrical feedback output, said first photodetector being mounted adjacent said lamp at a position corresponding to a positive phase anti-node of said selected acoustic resonance mode, and detecting said light using a second photodetector configured to provide a second electrical feedback output, said second photodetector being mounted adjacent said lamp at a position corresponding to a negative phase anti-node of said selected acoustic resonance mode.

18. The method according to claim 12, wherein said detecting comprises detecting said light using a photodetector, and wherein said method further comprises projecting an image of said lamp on said photodetector using an optical element.

19. The method according to claim 12, wherein said detecting comprises detecting said light using a photodetector, and wherein said method further comprises providing a mask comprising an opaque element having an opening therein, said photodetector being positioned for receiving light through said opening.

* * * * *